United States Patent [19]

Medina

[11] Patent Number: 5,907,318
[45] Date of Patent: May 25, 1999

[54] FOOT-CONTROLLED COMPUTER MOUSE

[76] Inventor: Carlos A. Medina, 13380 S. W. 131 St., Suite 116, Miami, Fla. 33186

[21] Appl. No.: 08/784,827

[22] Filed: Jan. 17, 1997

[51] Int. Cl.[6] .......................................................... G09G 5/08
[52] U.S. Cl. ............................................ 345/163; 463/37
[58] Field of Search ..................................... 345/155, 156, 345/157, 158, 159, 161, 162, 163, 164, 165, 167; 463/37

[56] References Cited

U.S. PATENT DOCUMENTS

| | | | |
|---|---|---|---|
| 4,797,665 | 1/1989 | Ida et al. | 345/164 |
| 5,248,961 | 9/1993 | Fujii | 345/167 |
| 5,583,541 | 12/1996 | Solhjell | 345/163 |
| 5,691,747 | 11/1997 | Amano | 345/163 |
| 5,745,055 | 4/1998 | Redich et al. | 345/163 |
| 5,751,274 | 5/1998 | Davis | 345/157 |

*Primary Examiner*—Steven J. Saras
*Assistant Examiner*—John G. Lim
*Attorney, Agent, or Firm*—Robert M. Downey, P.A.

[57] ABSTRACT

A computer mouse for generating and delivering control signals to a computer includes a foot-operated device having a housing with a top foot engaging surface, a bottom surface and an interior with one or more rollers rotatably captivated therein and disposed in moving engagement with a fixed surface. Movement of the user's foot is transmitted to the rollers, causing rotation of the rollers in a direction corresponding with the direction of foot movement. Detectors within the housing sense movement of the rollers in the x and y directions and translate the roller motion into electrical signals by generating pulses. A micro controller receives and interprets the pulses to determine linear direction of movement of the rollers in the x and y direction and transmits the interpreted data to a computer. Mechanical clicking operation is provided, wherein the one or more rollers are axially moved in response to downward force of the user's foot on the mouse, causing a switch to be operated momentarily to an on state. Alternatively, the clicking operation is performed electronically, wherein light sensors detect foot movement by comparing sensed light with predetermined ambient light conditions.

4 Claims, 9 Drawing Sheets

FOOT-CONTROLLED COMPUTER MOUSE

BACKGROUND OF THE INVENTION

1. Field of the Invention

The present invention is directed to a foot-controlled computer mouse for use independently or in conjunction with a hand-operated computer mouse for delivering control signals to a computer.

2. Description of the Related Art

The operating systems of most state of the art computers, including the software which runs on these systems, is largely dependent on the use of a mouse for moving a pointer or cursor on the display and to activate specific areas and/or icons on the display. Systems such as WINDOWS 95 and MACINTOSH systems require the user to use a hand-operated computer mouse in order to perform numerous functions to operate the computer and to utilize software programs. Further, use of various programs to navigate on the Internet is highly dependent on the point and click operations of a computer mouse.

While the use of a hand-operated computer mouse to enter commands and perform various functions on a computer has been well accepted and is now a standard operating component, there are times when the use of a hand-operated mouse is inconvenient. For instance, when completing a form or making entries on a spreadsheet, it is necessary to move the cursor (pointer) to each area on the form and then to click on the mouse to activate that area prior to making an alpha numeric entry using the keyboard. Performing this task requires the computer operator to constantly remove his/her hand from the keyboard to grasp the mouse in order to move the cursor to the next entry area. This constant hand movement between the keyboard and mouse reduces the efficiency of the computer operator and sometimes results in confusion if the operator looses his/her place on the display. In other instances, a typist using a word processing program may find it inconvenient and burdensome to constantly remove their hands from the keyboard to operate the mouse when entering menu commands to perform various functions of the word processing software.

In view of the problems and limitations associated with the use of a hand-operated computer mouse, there is an urgent need in the art for a computer mouse which does not require use of the hands so that the computer operator can maintain his/her hands on the keyboard or other peripheral computer operating device. The present invention proposes a solution to the problems and limitations of the hand-operated computer mouse and provides a foot-controlled computer mouse which frees the computer operator's hands to operate the keyboard or other peripheral devices.

SUMMARY OF THE INVENTION

A computer mouse for generating and delivering control signals to a computer includes a foot-operated device having a housing with a top foot engaging surface, a bottom surface and an interior with a plurality of rollers rotatably captivated therein and disposed in moving, free rotating (omni-directional) engagement with a fixed surface, such as the bottom interior surface of the mouse housing. Movement of the user's foot is transmitted to the rollers, causing rotation of the rollers in a direction corresponding with direction of foot movement. Detectors within the housing sense movement of the rollers in the x and y directions and translate the roller motion into electrical signals by generating pulses. A micro controller receives and interprets the pulses to determine linear direction of movement of the rollers in the x and y direction and transmits the interpreted data to a computer. Mechanical or electrical click command means are provided for making click commands associated with conventional mouse operation.

The present invention proposes various embodiments to achieve the desired operational advantages of a foot-controlled computer mouse, including the ability to maintain the hands on the keyboard at all times for faster data entry. In one embodiment, the foot-controlled computer mouse is of a sandal-type structure including a base and a foot strap. In a similar embodiment, the mouse is provided in the form of a shoe. In each of these embodiments, the mouse is worn on the foot and a base of the mouse is moved over a floor surface so that a springloaded track ball on the bottom of the mouse gauges the floor surface and moves as the operator's foot is moved. Click commands are performed by pressing downwardly against the floor surface, causing the track ball to move inwardly against a spring to actuate a switch. In another embodiment, the mouse comprises a base with a bottom which rests on the floor and a track ball on the top surface which is operated by moving the foot against the ball to rotate the ball in the x and y coordinates. A click command operation is performed by pressing downwardly with the foot against the ball to move the ball inwardly relative to the mouse housing against a spring to operate a switch. The direction of movement of the foot on the track ball governs the direction of the cursor on the display. In still another embodiment, the mouse is provided in the form of a generally flat stealth-like housing having a top foot engaging surface and a bottom surface with a plurality of track balls or rollers which are rotatably captivated in the housing, within holders, and in engagement with inner surfaces of the housing. Movement of the mouse housing relative to the floor surface, by pushing with one's foot on the top foot engaging surface results in the rollers rotating in a direction corresponding with the direction of foot movement. The detectors within the housing determine direction of movement of the rollers in the x and y coordinates. This movement is translated into an electrical signal which is transmitted to the computer to cause movement of the cursor on the screen in a direction which corresponds with direction of movement of the mouse housing and, accordingly, the operator's foot. Light sensors on the top foot engaging surface determine movement of the foot relative to the top surface of the mouse housing by comparing sensed light with ambient light conditions. The operator's foot is moved to either cover or expose the light sensors to thereby perform click type command operation of the mouse.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Figure 1:
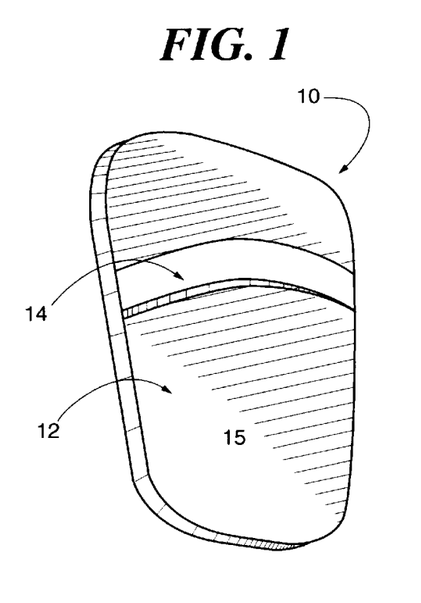
FIG. 1 is a top perspective view of a first embodiment of the foot-controlled computer mouse of the present invention.
Figure 2:
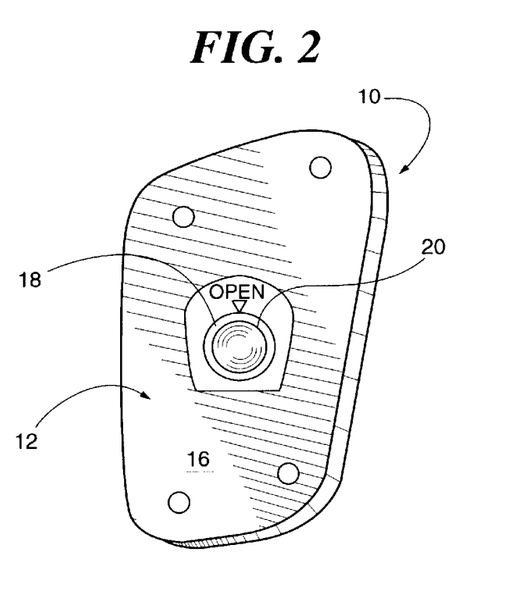
FIG. 2 is a bottom perspective view of the embodiment of FIG. 1.

Referring to the several views of the drawings, and initially FIGS. 1–2, the foot-controlled computer mouse is shown and generally indicated as 10, in accordance with a first embodiment. In this particular embodiment, the foot-operated device 10 is of a sandal-type construction including a base 12 and a foot strap 14. The strap is secured at opposite ends to the base 12 and permits receipt of a user's foot between the strap 14 and the top 15 of the base 12 so that the device 10 remains secured to the foot. A bottom surface 16 of the base 12 is provided with a track ball 20 which remains captivated within a socket 18 on the base, in moving relation therein, with a portion of the surface area of the track ball 20 being exposed and protruding from the bottom 16 of the base 12 for engagement with a ground surface. Upon movement of the user's foot, with the ball maintained against the floor surface, the track ball 20 is caused to rotate in accordance with x and y coordinates for left and right movement and forward and rearward movement.

Figure 3:
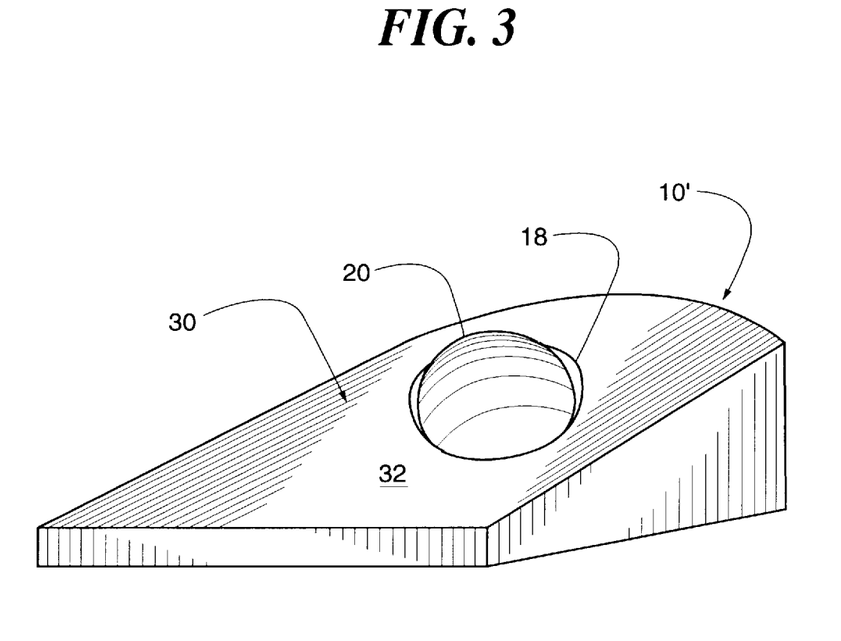
FIG. 3 is a top perspective view of a second embodiment of the foot-controlled computer mouse including a non-movable base and a track ball on a top thereof.

FIG. 3 illustrates a second embodiment 10' of the foot-controlled computer mouse wherein a non-movable base 30, defining a housing, is supported on a floor surface. A top side 32 is positioned and disposed for placement of the computer operator's foot thereon so that the bottom of the operator's foot engages an exposed surface of the track ball 20. Movement of the operator's foot against the track ball 20 causes the ball to rotate within socket 18 in accordance with the x and y coordinates of foot movement.

Figure 4:
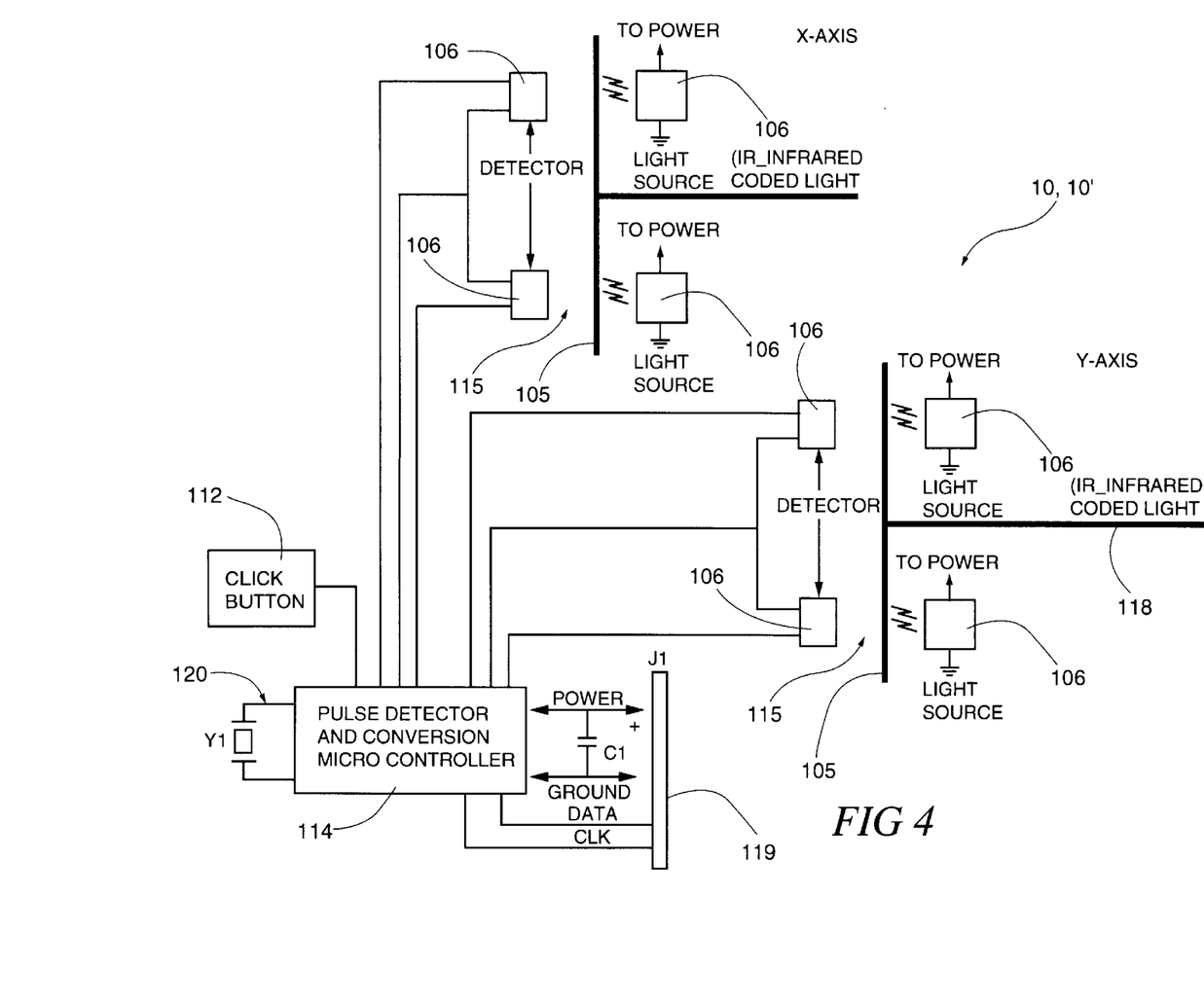
FIG. 4 is a schematic diagram illustrating the component elements of the embodiments of FIGS. 1–3.
Figure 5:
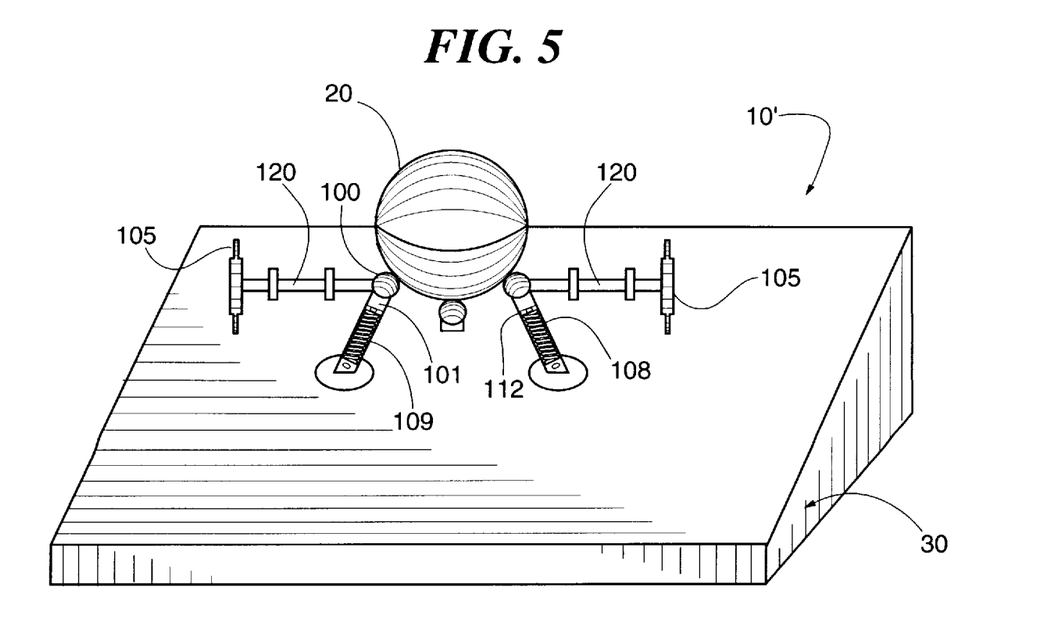
FIG. 5 is a perspective view of the internal components of the embodiment of FIG. 3.

In each of the embodiments of FIGS. 1–3, the track ball 20 is movable inwardly into the housing against spring-loaded bearings to actuate a click button switch 112, as seen in FIGS. 4 and 5. A micro controller 114 is of a fundamental component of the foot mouse 10, 10' and receives pulses generated by a movement detector means 115. In a preferred embodiment, the movement detector means 115 is a disc encoder which uses a pair of optic couplers 106 and an optic disc 105 rotated between the optic couplers. The optic disc 105 is drivingly rotated by movement of the track ball 20. In a preferred embodiment, there are two disc encoders, one for the x component of movement and one for the y component of movement. As the optic discs 105 are rotated in accordance with the x and y coordinates of track ball movement, the x axis disc encoder 115 senses left and right movement depending upon the direction of rotation of the optic disc 105. Likewise, the y axis disc encoder 115 determines forward and rearward movement (or up and down movement on the display screen) in accordance with the direction of rotation of the optic disc 105 as driven by the track ball 20. The optic couplers 106 of each of the disc encoders 115 must be on to detect motion. The optic couplers 106 provide a constant beam of light which penetrates through the rotating optic disc 105 and, by reading or detecting the light which penetrates through gaps in the optic disc 105, the disc encoder 115 is able to translate circular motion into a pulse train. The optic couplers 106 of the disc encoder 115, detecting movement of the optic disc 105 enable the disc encoder 115 to generate pulses corresponding with the direction of movement of the track ball along the x and y coordinates, as well as the speed and amount of movement. The generated pulses, encoded with motion along the x or y coordinates, are delivered to the micro controller 114. The pulses generated by the disc encoders 115 or other motion detecting devices, are generally sign wave in nature. The micro controller 114 performs filtering and pulse shaping of the sign wave pulses received from the disc encoders 115.

The clicking or depressing of the track ball 20 actuates micro switch 112 to generate an on/off signal which is fed to the micro controller 114. The micro controller 114 encodes the on/off signals and the pulses from the disc encoders 115 and this data is sent out to the computer to which the foot-controlled computer mouse 10, 10' is connected. The data from the x and y directional movement and clicking of the switch 112 between the on/off state is converted in the computer to the correct protocol (MM Series, SB; Five Byte Packed Binary, RE; Relative Bit Pad One; and other commonly used protocols) and sent via cable or wireless communication to the computer.

A crystal oscillator 120 is used as a clock source for timing and to run the micro controller 114. All data received and transmitted from the micro controller 114 is referenced to the crystal oscillator 120 to ensure timing.

Referring to FIG. 5, the track ball 20 is shown supported on bearings 100 which hold and maintain the track ball 20, while permitting rotation thereof in all directions. The bearings 100 are supported at the end of cylinders 109. Springs within the cylinders urge the track ball 20 outwardly relative to the housing, through an opening on the bottom of the mouse. Upon inwardly pressure on the track ball 20, the springs are compressed, allowing the track ball 20 to move inwardly until switch 112 is actuated. When foot pressure is released, the track ball 20 is urged outwardly by the springs 108 in the cylinders 109 until the ball is stopped by the bottom wall of the housing of the foot mouse device 10, 10'.

Referring to FIGS. 6–12, a third preferred embodiment of the foot-controlled computer mouse is shown and indicated as 10". The computer mouse 10", in this particular embodiment, is provided in a stealth-like housing 12' which is relatively flat in structure and includes a top foot engaging surface 50, a bottom surface 54, and an interior chamber 56 for housing the various components of the mouse 10". A plurality of rollers 20' are movably captivated within holders 60 in the housing interior with a portion of the surface area of each of the rollers 20' being disposed in engagement with an inner surface of the bottom 54 or other fixed surface over which the chrome plated steel ball rollers 20' are movable. The top foot engaging surface 50 is adapted for placement of the computer operator's foot thereon, whereupon movement of the operator's foot, while maintaining contact with the top foot engaging surface, results in movement of the top surface 50 relative to the underlying bottom 54 to cause the rollers 20' to rotate within the holders. Detectors 115 within the housing determine direction of movement of the rollers in accordance with the x and y directional coordinates. This movement of the rollers 20' is translated into electrical pulses which, in turn, are transmitted to the computer to cause movement of the cursor on the computer display in a direction which corresponds with the direction of movement of the mouse 10" relative to the floor surface, similar to the previously described embodiments.

Figure 6:
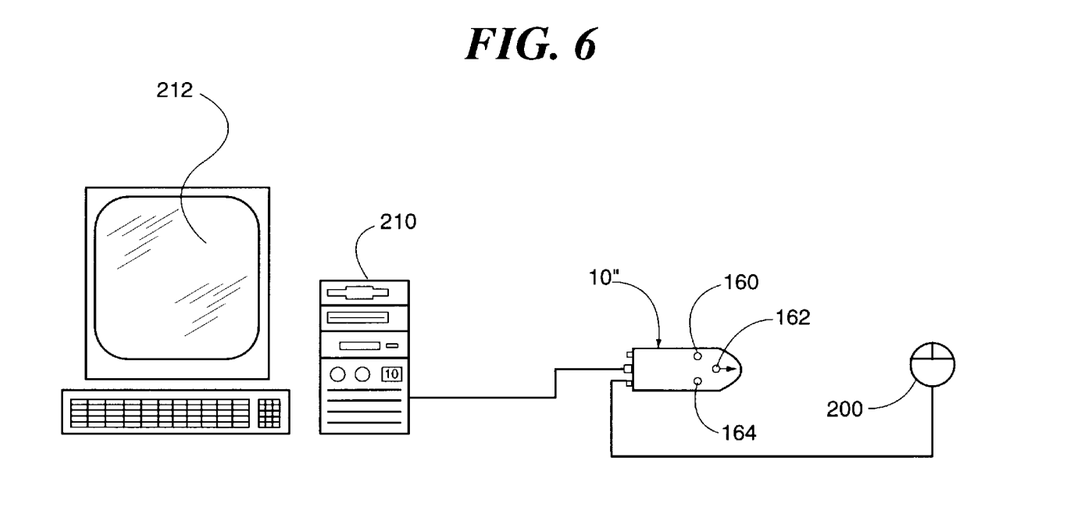
FIG. 6 is a system diagram showing a third embodiment of the foot-controlled computer mouse interconnected between a hand-controlled mouse and a serial port of a computer.
Figure 7:
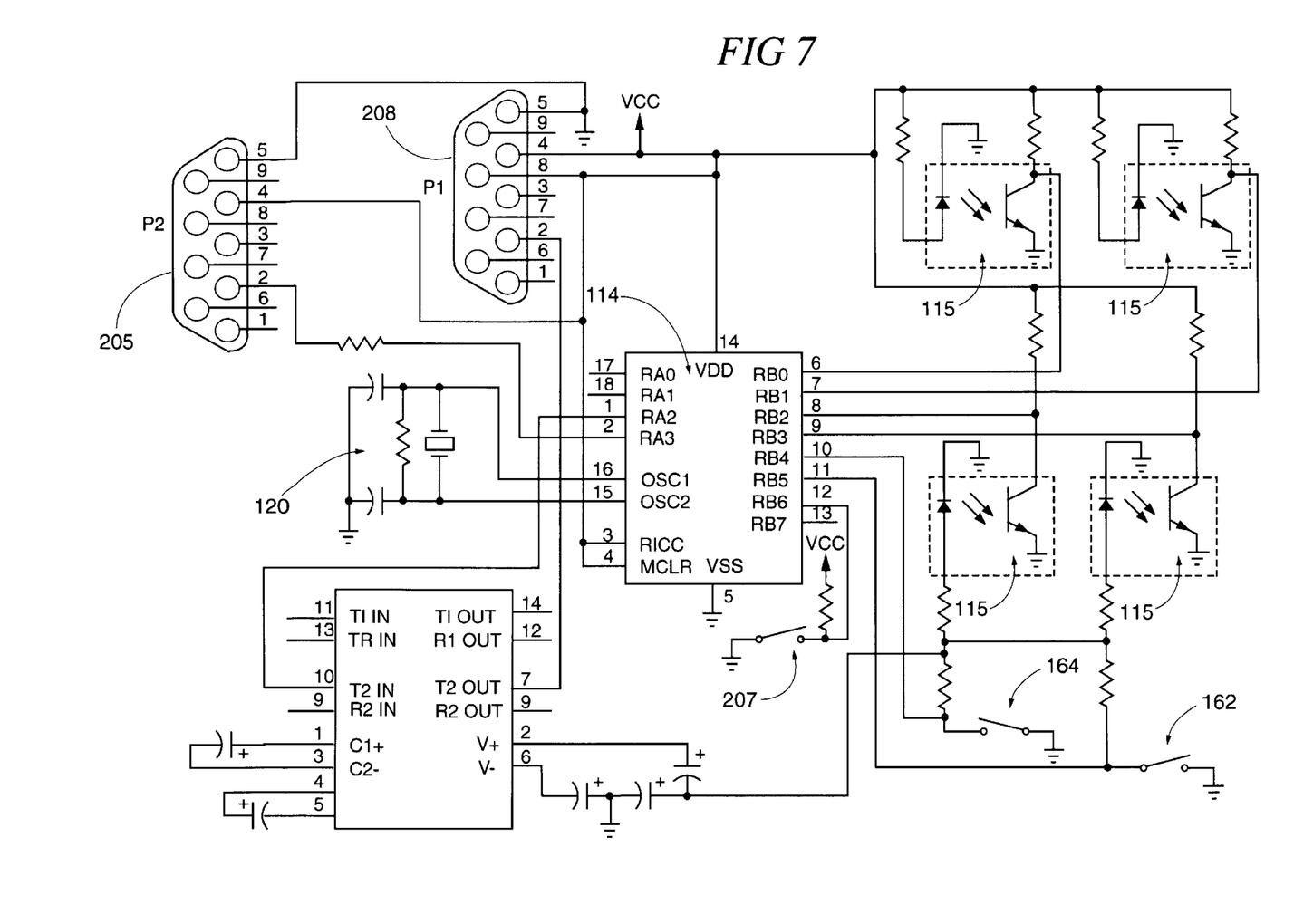
FIG. 7 is a schematic diagram illustrating the component elements of the foot-controlled computer mouse in accordance with the third embodiment.
Figure 8:
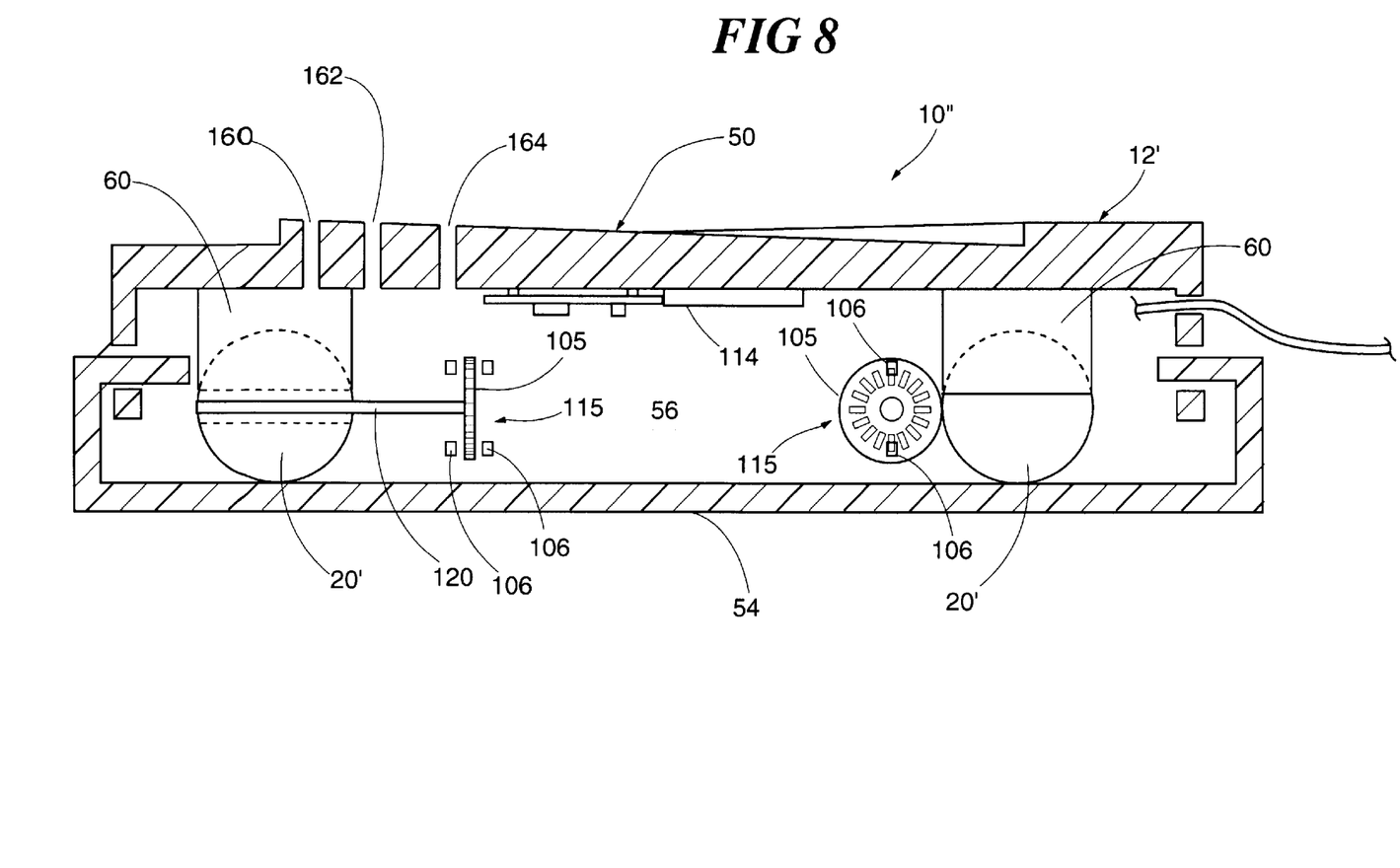
FIG. 8 is a top plan view of a general diagram illustrating the internal components of the third embodiment of FIGS. 6 and 7.

The foot-controlled computer mouse 10" is adapted for use in conjunction with a hand-controlled computer mouse 200. As seen in FIG. 6, the foot-controlled computer mouse 10" interconnects between a hand-controlled computer mouse 200 or other pointing device and the serial port of a computer 210. Light sensors on the top foot engaging surface of the computer mouse 10" are used to perform click type command operation of the mouse, having the same effect as depressing the track ball 20 against the springs in accordance with the previously described embodiments. Specifically, the mouse 10" includes an ambient light sensor 160, a first control light sensor 162 in the center of the top surface, and a second control light sensor 164 on the right side of the top surface of the mouse 10". The ambient light sensor 160 senses ambient light conditions which are used as a reference for comparison to light sensed by the control light sensors 162, 164. The light sensors determine movement of the foot relative to the top foot engaging surface of the mouse 10" by comparing sensed light at the control light sensors 162, 164 with measured ambient light conditions, as determined by the ambient light sensor 160. When the operator's foot is moved to expose either the first control light sensor 162 or the second control light sensor 164, ambient light is sensed by the respective control light sensor 162, 164 to actuate a click type command associated with that particular control light sensor. This click command, from either the first control light sensor or the second control light sensor is then transmitted to the computer 210 as a command entry to, for instance, activate an icon on the display 212 of the computer 210.

Figures 9, 10:
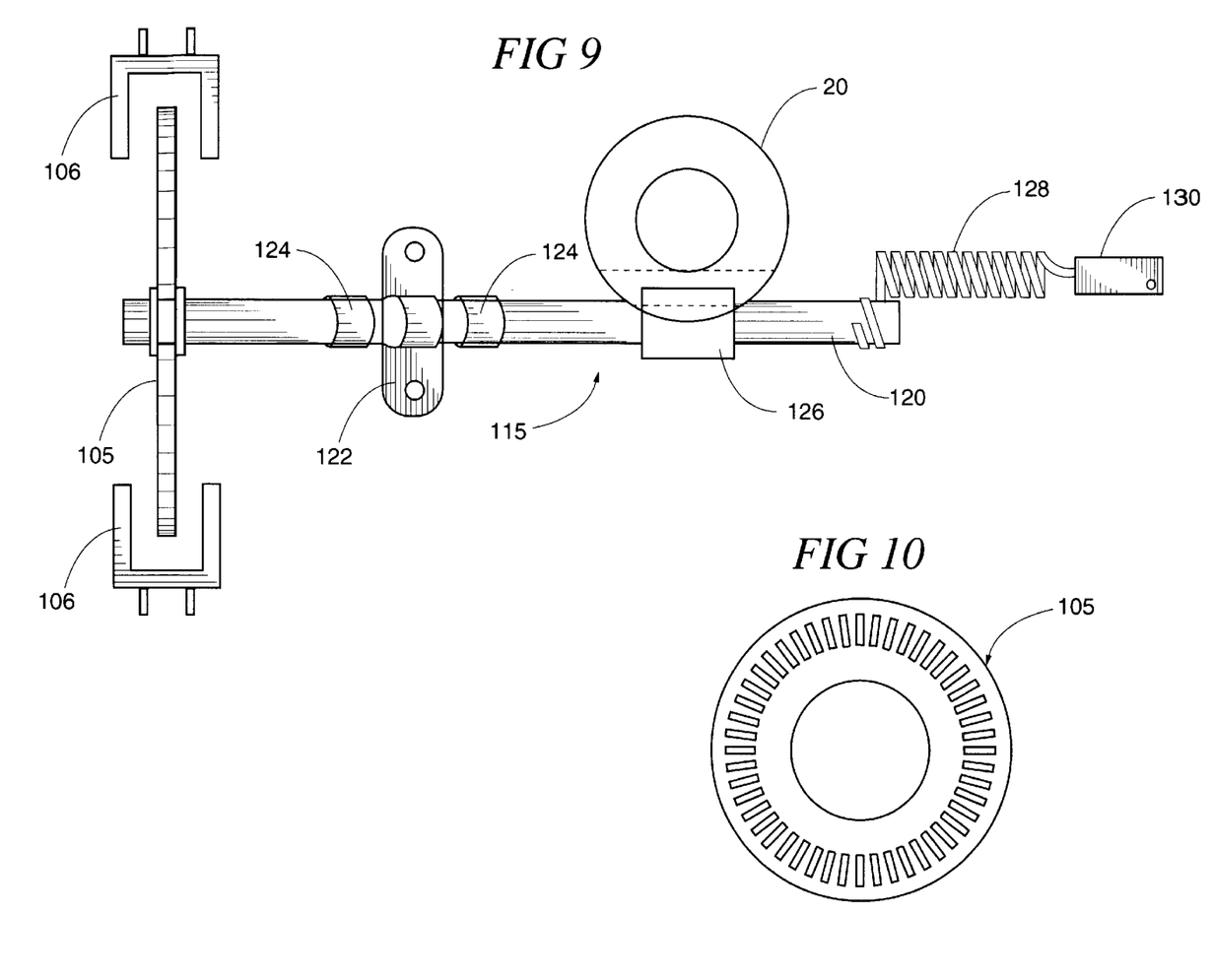
FIG. 9 is an isolated top plan view of a disc encoder for translating x and y motion of the roller or track ball to convert mechanical movement to electrical pulses.
FIG. 10 is a side plan view of an optical disc used in connection with the disc encoder.
Figure 11:
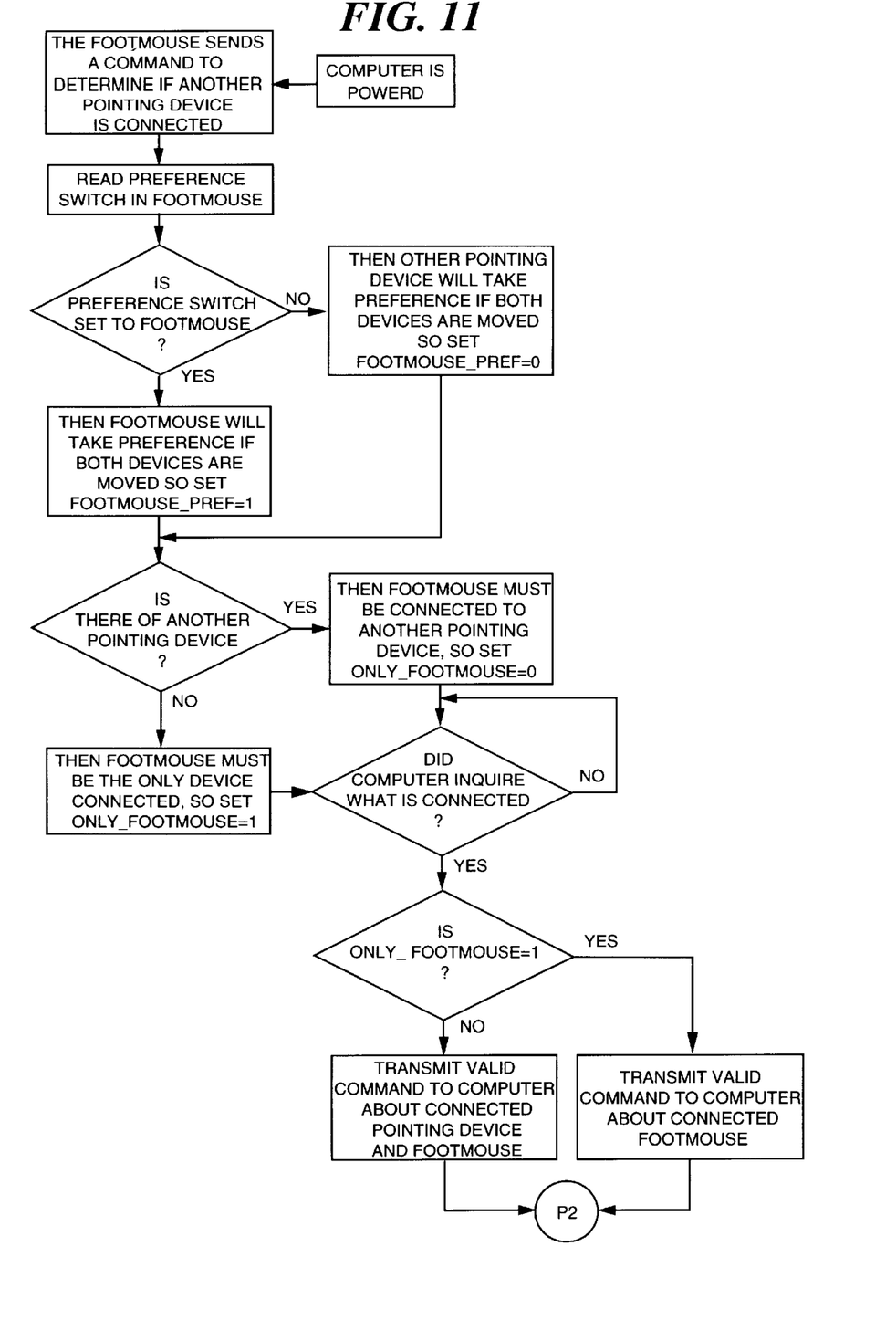
FIG. 11 is a functional block diagram of an operating sequence of the foot-controlled computer mouse in accordance with the third embodiment.
Figure 12:
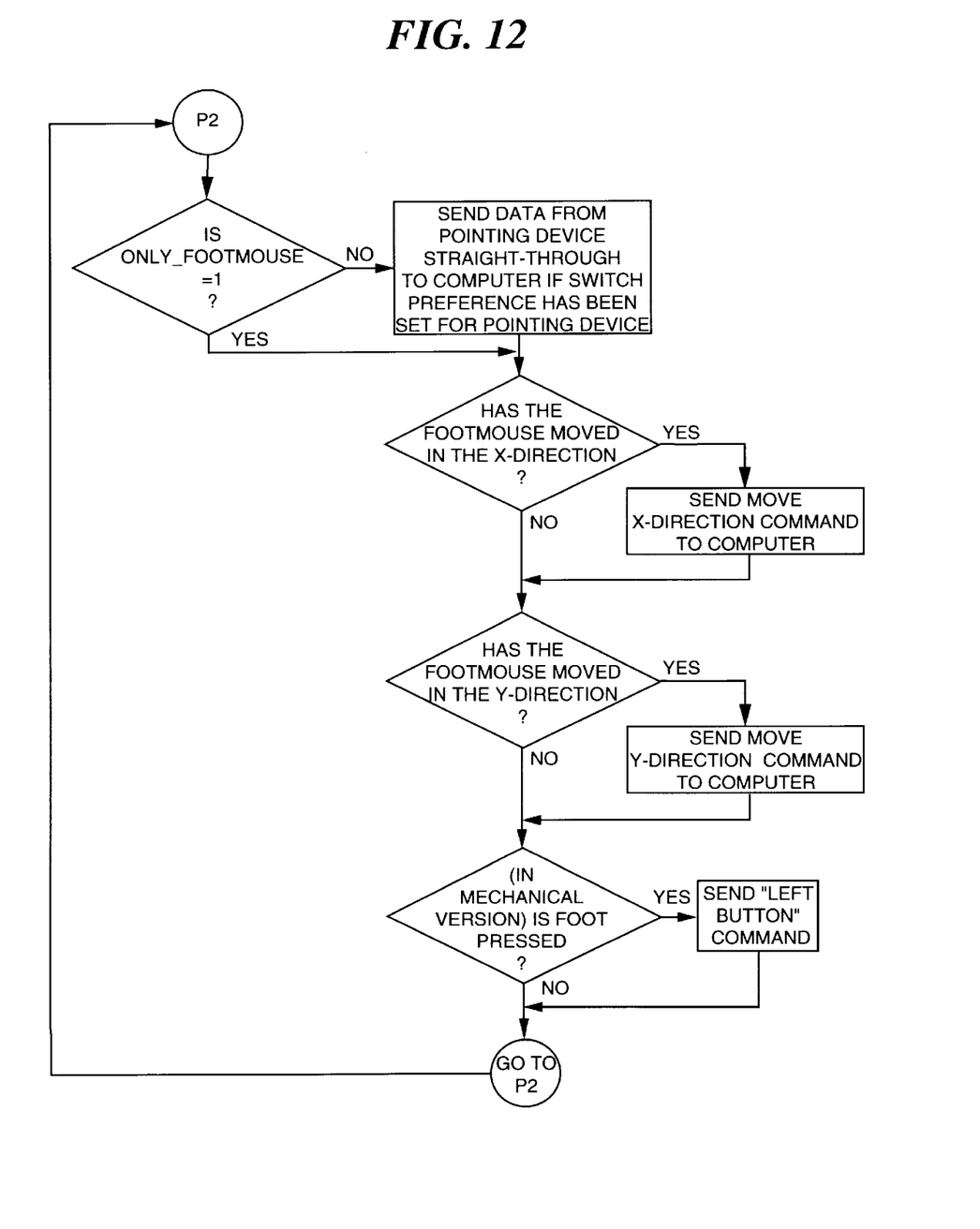
FIG. 12 is a functional block diagram continuing the operating sequence of FIG. 11 wherein the click command operation is mechanical.
Figure 13:
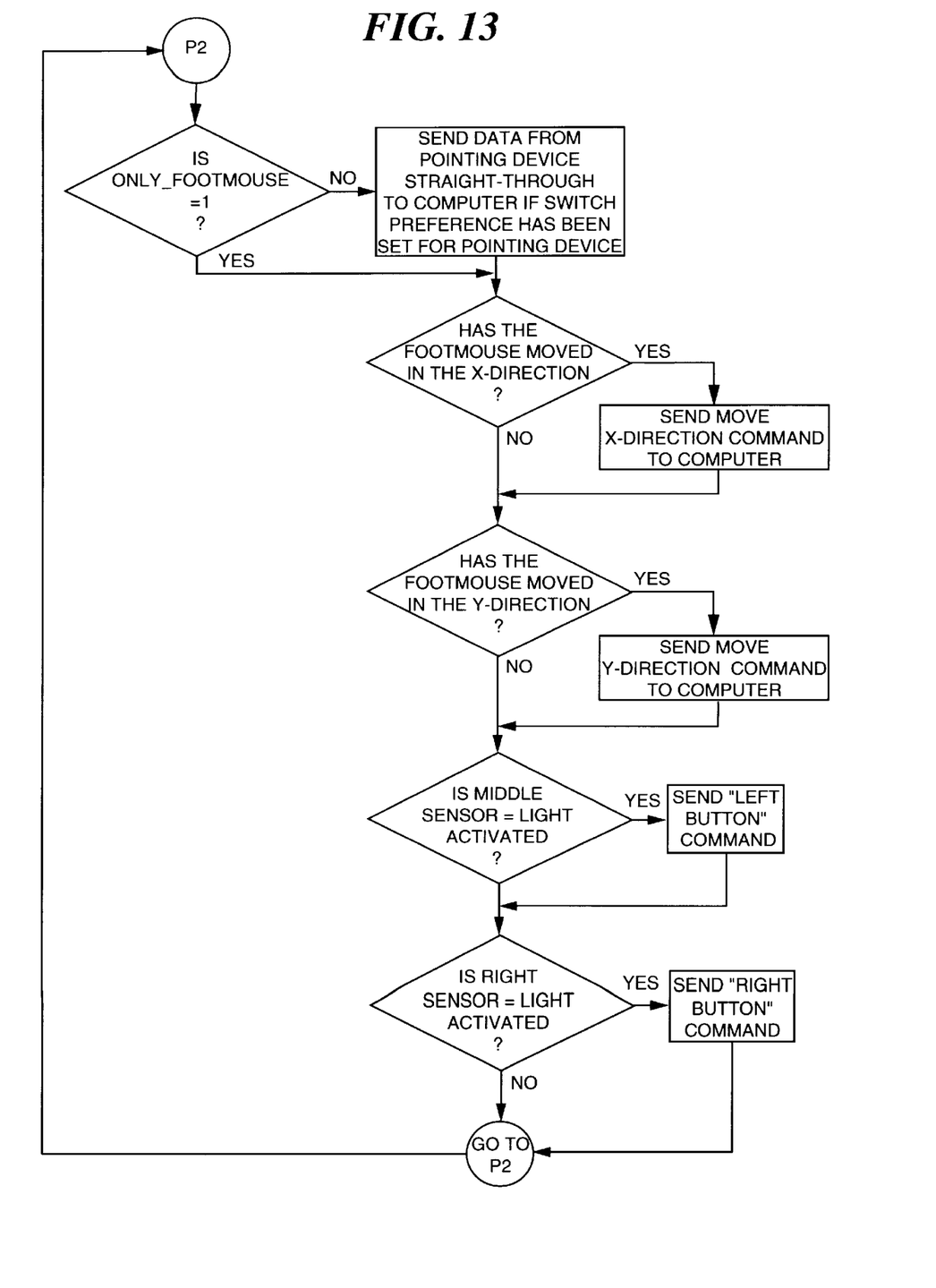
FIG. 13 is a functional block diagram continuing the operating sequence of FIG. 11 wherein the click command operation comprises light sensors.

Referring to FIG. 9, the disc encoder 115, in accordance with a preferred embodiment of the movement detector means, is shown. The disc encoder 115 includes shaft 120 which is mounted to an inside of the mouse 10" housing with a bracket 122 through a bushing to permit rotation of the shaft 120 relative to the bracket 122. Fitted to the shaft 120 on opposite sides of the bracket 122 limit axial movement of the shaft 120 relative to the bracket 122. The optic disc 105 is mounted at one end of the shaft 120, with the optic couplers 106 on opposite sides so that the optic disc 105 rotates between the light emitting source and the light receiver of each of the optic couplers 106. A silicone rubber sleeve 126 fitted to the shaft 120 engages the track ball or roller 20, causing the shaft to rotate as the track ball or roller 20 rotates. It should be noted that the shaft 120 will only rotate according to the degree of rotation of the track ball 20 about a rotational axis through the track ball which is parallel with the axis rotation of the shaft 120. In other words, the shaft will only rotate according to either the x component or y component of rotation of the track ball or roller 20. A spring 128 fitted to the opposite end of the shaft urges the silicone rubber sleeve 126 against the roller ball 20. The spring is fitted to the housing with a clip holder 130.

Referring to FIGS. 7 and 11–13, the components of the mouse 10" permit use of foot-controlled computer 10" in conjunction with a hand-controlled computer mouse. To avoid duplicate input, where both the foot-controlled mouse 10" and the hand-controlled mouse send information at the same time, the hand-controlled mouse cable is connected to an input port 205 on the foot-controlled mouse 10". The foot mouse connects, via a cable, from an output port 208 of the foot mouse 10" to the computer's serial port. The foot-controlled mouse 10" has a selectable switch 207 which allows the foot-controlled mouse 10" to take preference over the hand-controlled mouse. It should be noted that the preference selectable switch does not have to be on the foot-controlled mouse 10", but can be externally located or on the hand-controlled mouse. Software for reading the commands from both the foot-controlled mouse 10" and the hand-controlled mouse reads the preference switch 207 and determines the selection, as indicated in the flow chart of FIG. 11.

While the movement detector means 115 of the present invention has been shown and described in accordance with a preferred embodiment as an optical disc encoder, it should be noted that other means for motion detection can be used including a potentiometer type encoder to generate analog signals corresponding with movement, wherein the micro processor communicates with an analog to digital converter. Alternatively, incremental digital encoders may be used, wherein a digital signal is fed to the micro controller.

While the instant invention has been shown and described in accordance with what is considered to be preferred and practical embodiments thereof, it is recognized that departures may be made within the spirit and scope of the present invention which, therefore, should not be limited except as set forth in the following claims as interpreted under the doctrine of equivalents.

Now that the invention has been described,

What is claimed is:

1. A computer mouse comprising:

a housing including a top foot engaging surface, a bottom, and an interior;

roller means for transmitting foot movement by creating electronically readable mechanical movement along x and y coordinates corresponding with movement of a user's foot and being movably supported and captivated with said housing and having a portion of a surface area thereof disposed in rolling engagement with a fixed surface to cause rotation of said roller means in a direction corresponding with direction of movement of an operator's foot;

movement detection means within said interior of said housing for detecting directional movement of said roller means in accordance with the x and y coordinates;

signal generating means communicating with said movement detection means for generating an electrical signal corresponding with detected movement of said roller means along the x and y coordinates;

command entry means for entering a click command and including an electric switch operable between an on and off state in response to inwardly directed axial movement of said roller means relative to said housing, said electric switch being structured to generate an on/off signal upon entering said click command, and said roller means including at least one track ball supported on bearings, said bearings supported at the end of a cylinder, and said command entry means further including spring means within said cylinder for urging said track ball outwardly relative to said cylinder, wherein said track ball is structured to move inwardly upon application of inwardly directed pressure thereon, causing said spring means to compress, and actuating said electric switch to thereby generate said on/off signal, and said spring means being further structured to urge said track ball outwardly, away from said electric switch, upon release of said inwardly directed pressure on said track ball;

a micro processor for receiving said generated electrical signals and said on/off signal and for transmitting said electrical signals and said on/off to the computer; and timer means for maintaining timing of said micro processor to receive and transmit said on/off signal and said electrical signals.

2. A computer mouse as recited in claim 1 wherein said roller means includes at least one steel ball rotatably captivated within said housing.

3. A computer mouse as recited in claim 2 wherein said movement detection means comprises at least one disc encoder communicating with said steel ball, said disc encoder being structured and disposed for translating mechanical movement of said steel ball along the x and y coordinates into an electrical response for communication with said signal generating means.

4. A computer mouse comprising:

a housing including a top foot engaging surface, a bottom, and an interior;

roller means for transmitting foot movement by creating electronically readable mechanical movement along x and y coordinates corresponding with movement of a user's foot and being movably supported and captivated with said housing and having a portion of a surface area thereof disposed in rolling engagement with a fixed surface to cause rotation of said roller means in a direction corresponding with direction of movement of an operator's foot;

movement detection means within said interior of said housing for detecting directional movement of said roller means in accordance with the x and y coordinates;

signal generating means communicating with said movement detection means for generating an electrical signal corresponding with detected movement of said roller means along the x and y coordinates;

command entry means for entering a click command and including an electric switch operable between an on and off state, said command entry means further including a plurality of light sensors on said top foot engaging surface, said plurality of light sensors including an ambient light sensor, a first control light sensor, and a second control light sensor, said ambient light sensor being structured to sense and measure ambient light conditions as a reference, said plurality of light sensors being further structured to determine movement of the operator's foot relative to said top foot engaging surface by comparing a sensed light at said first control light sensor and said second control light sensor with said measured ambient light condition, wherein sensed light at said first and second control light sensors results in operation of said electric switch between said on and off state, respectively;

a micro processor for receiving said generated electrical signals and said on/off signal and for transmitting said electrical signals and said on/off to the computer; and timer means for maintaining timing of said micro processor to receive and transmit said on/off signal and said electrical signals.

* * * * *